Oct. 2, 1934.  R. J. ANDERSON  1,975,529
REGULATOR FOR MOLDING MACHINES
Filed April 20, 1933   2 Sheets-Sheet 1
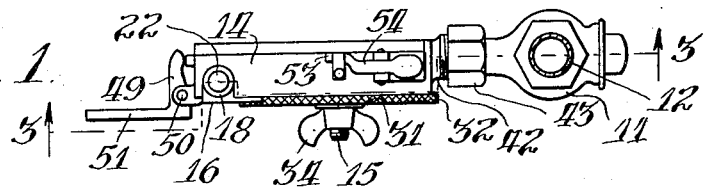
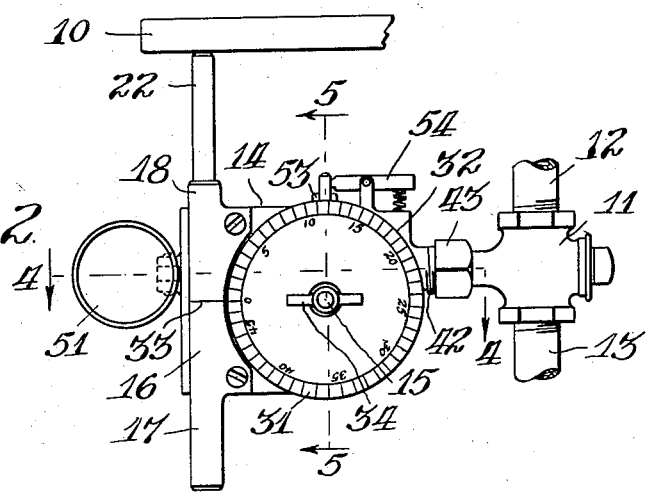
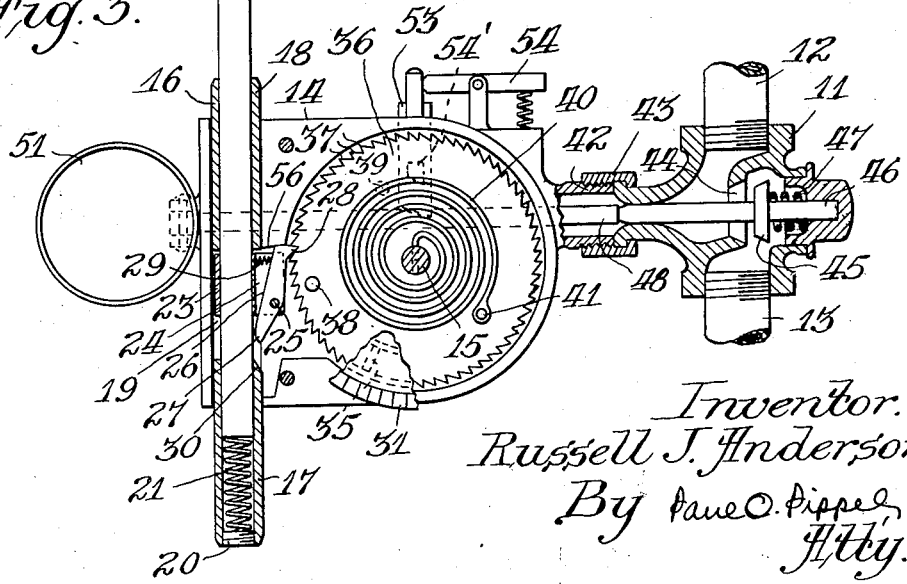
Inventor.
Russell J. Anderson,
By Paul O. Pippel
Atty.

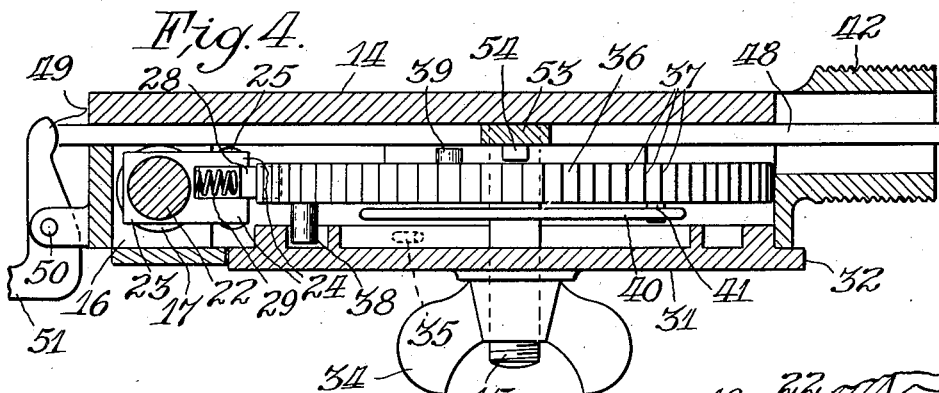

Patented Oct. 2, 1934

1,975,529

UNITED STATES PATENT OFFICE 1,975,529

REGULATOR FOR MOLDING MACHINES

Russell J. Anderson, Racine, Wis., assignor to Belle City Malleable Iron Company, Racine, Wis., a corporation of Wisconsin Application April 20, 1933, Serial No. 666,983

11 Claims. (Cl. 192—139)

The invention relates to a regulating device for controlling the number of jolts imparted to a mold by a jarring machine of the kind used in foundries for packing sand in a molding flask or box.

Such jarring machines as understood in this art comprise a flask supporting table actuated by an air operated piston. Actuation of the table is initiated by an operator who manually opens a valve in the air line to cause upward movement of the table and flask under the force of compressed air. After the piston has traveled upwardly the predetermined distance an exhaust valve opens causing the air to exhaust from the piston cylinder, whereupon the piston and loaded table drop by gravity against an anvil or abutment, to impart a sharp jolt to the mold and thus pack the sand therein. As the piston drops the exhaust is again closed to make the air once more operative to raise the piston, and so the raising and dropping cycles are repeated the desired number of times to jolt the flask, the operator manually shutting off the air when the flask has been sufficiently jolted or jarred.

The usual foundry practice requires the operator to count the number of jars imparted to the mold and as this involves carelessness the number of jolts cannot with certainty be uniform on a like run of molds, causing lack of uniformity in the castings produced. To overcome this fault it has been proposed to provide regulators which could be set for a given number of jolts and then shut off the machine. Such regulators, however, also caused errors because they could not uniformly operate step by step in increments of one and had the further objection of having to be manually set for each operation. Further they were not self contained with the valve to be controlled and required linkages that made for error due to the uneven travel of the table. Accuracy and positiveness in such regulator is of the utmost importance if uniformly good casings are to be produced.

Accordingly, it is the main object of this invention to provide an improved regulator of the kind stated which will be positive and accurate.

Another object is to provide such a regulator which will always operate step by step in increments of one and which will automatically reset itself and shut off the main air valve when the molding machine has delivered a predetermined or given number of jolts.

Still another object is to provide such a device adapted for easy association with a standard molding machine without materially altering the construction thereof.

Another object is to provide a unitary regulator directly connected to the control valve so that the regulator will be fool proof and positive.

Other objects of the invention will be apparent to those skilled in this art as the disclosure continues.

Such objects may be achieved in the preferred embodiment of the invention by providing a rotary step by step regulator actuated by a sliding means governed by reciprocation of the jarring machine table, said rotary means governing a slidable element directly connected to the air supply valve, all regulator mechanism contained in a housing to provide a self contained unitary device, as will presently more fully appear.

In the accompanying sheets of drawings illustrating a practicable form of the invention:

Figure 1 is a top plan view of the self contained, improved regulator on a reduced scale;

Figure 2 is a front elevational view of the regulator on the same reduced scale;

Figure 3 shows a vertical sectional view, on a somewhat larger scale, taken along the line 3—3, appearing in Figure 1, when looking in the direction of the arrows;

Figure 4 is a horizontal sectional view, full size, as viewed along the line 4—4 of Figure 2 when looking downwardly as indicated by the arrows;

Figure 5 is a full size vertical sectional view as seen along the line 5—5 of Figure 2 when looking in the indicated direction;

Figure 6 is an enlarged sectional view showing a detail of the operating mechanism; and, Figure 7 is another detail sectional view.

As the jarring molding machine is of well known construction, it is unnecessary to show the same, it being sufficient for the purposes of this disclosure to indicate the same by the horizontal table 10 (Figures 2 and 3) which is movable upwardly by a compressed air, operated piston; and, when the air is suddenly exhausted from the cylinder containing the piston, the table drops by gravity against an anvil abutment to jolt a flask carried thereby. The air line valve, later to be described, for passing compressed air to operate the table is enclosed in a housing 11 having a connection 12 to a source of compressed air supply, not shown and another connection 13 to move the piston for the table 10.

The self contained regulator is enclosed in a box shaped body 14 the back wall of which carries a perpendicularly disposed, forwardly extending pin or shaft 15 formed as a part of, or otherwise secured to the back wall of the body. Said body is formed with an open front face, the front left hand portion thereof, as shown in Figures 2 and 4 being closed by a plunger carrier or body portion 16 secured in any desired manner to the main body 14.

This plunger carrier 16 is formed with a lower sleeve 17 and an upper sleeve 18, the two sleeves being vertically alined and spaced apart as shown in Figure 6 to leave a space 19. A screw plug 20 closes the bottom end of the sleeve 17 to hold a coil spring 21 in the said sleeve. A plunger 22 is passed into the two sleeves 18 and 17 as shown with its upper end exposed the appropriate distance above the body 14. Secured to the plunger 22 within the space 19 is a block 23 having ears 24 carrying a pin 25 to which is pivoted intermediately of its ends a pawl 26 having a tail 27 and a ratchet engaging head 28. A spring 29 between the block 23 and pawl normally urges the head 28 outwardly away from the plunger 22 for a purpose later to appear. The tail 27 of the pawl 26 is curved to cooperate with a sloped guide shoulder 30 as shown in Figure 6.

The plunger carrier 16 has its right hand edge as shown in Figure 2 arcuated and with the right hand edge of the body 14 forms a front circular opening, which is closed by a circular index plate 31 having an exposed knurled hand grip edge 32 so that it may be turned on the shaft 15 which carries the same. The face of this index plate, or wheel, on its margin is marked off with radial index marker lines numbered herein by way of example from zero to forty-five, and the plunger carrier 16 has its face provided with a telltale index line 33 (see Figure 2). A wing nut 34 on the shaft 15 serves to secure the index wheel or plate 31 in position, with any selected index position from zero to forty-five in line with the line 33 in accordance with the number of jolts desired, as will later be explained. On the inside face of the index plate 31 is a radially disposed stop pin 35.

The shaft 15 loosely and turnably carries a ratchet wheel 36 provided on its periphery with forty-five ratchet teeth 37 corresponding to the number of index lines on the plate 31. On its front face the ratchet wheel 36 carries a pin 38 designed to engage the stop pin 35 heretofore described, while on its back side the wheel 36 carries a pin 39 angularly spaced from the pin 38 a predetermined distance. A coil spring 40 surrounds the shaft 15 and has one end anchored to said shaft and its other end anchored to the wheel 36 at 41 as shown in Figure 3 in such a manner, that when the wheel 36 rotates clockwise as shown in Figure 3, said spring 40 stores energy.

The right hand end of the main body, as viewed in Figure 3 is formed with a threaded nipple 42 adapted to be detachably, and directly secured to the valve body 11, by a nut 43. This body 11 is formed with a port 44 establishing communication between the leads 12 and 13, said port 44 being controlled by a valve 45 on a stem 46, there being a spring 47 surrounding the end of said stem to urge the valve to its closed position.

A rod 48, rectangular in cross section, is slidably mounted across the rear portion of the body 14, between its rear wall and the ratchet wheel 36, said rod being in abutting relation with the valve stem 46 as shown in Figure 3. The left hand end of this rod, as appears in Figure 4 protrudes out of the body 14 and is engaged by a lever 49 fulcrumed on a pin 50 carried by the body 14, said lever being manually actuated by a pad 51 (see Figures 1, 2 and 3). This rod 48 has a notch 52 in its top edge designed to receive a detent lock 53 which as shown in Figure 5 is urged into the notch by a spring pressed pivoted lever 54 carried on top of the body 14.

This detent lock pin 53 is bored out to receive a slidable, spring pressed holding dog 55 to engage the spaces between the ratchet teeth 37 to prevent back lash of the ratchet wheel 36 under the influence of the spring 41. The front face of the detent lock 53 carries a releasing shoe 54' designed to be engaged by the trip pin 39 heretofore described.

In use the regulator will be bracketed in any suitable manner to the cylinder base of the jarring machine. In mounting the regulator it is so located that it is about knee high and so that the top of the plunger 22 is resting against the bottom of the jarring table 10 of the molding machine. The regulator is mounted high enough so that when the table 10 is at rest, the plunger pin 22 is pushed down against the coil spring 21 far enough to cause the pawl head 28 to be disengaged from the ratchet wheel teeth 37 as appears in the released position shown in Figure 6. Next the wing nut 34 is loosened and the index plate 31 is turned counterclockwise until the mark indicating the desired number of jolts coincides with the telltale index line 33 on the body. Suppose for example we desire to impart five jolts to a flask on the table 10. Accordingly, the index line numbered 5 on the wheel plate 31 is made to coincide with the telltale line 33 and the nut 34 is then used to clamp the index plate securely in such selected position. Of course, at this time the spring 47 is holding the valve 45 closed, and the lock 53 is out of the notch 52 and resting yieldingly on the top edge of the rod 48. This also holds the lock 53 so high that the pin 55 is in inactive position with respect to the ratchet teeth 37. The energy of the spring 41 also moves the freed ratchet wheel 36 to the set starting position as determined above, at which time the pin 38 on the ratchet wheel is in abutting position against the pin 35 on the locked index plate 31.

To start the operation of five jolts as predetermined, the operator moves pad 51 with his knee thus actuating the lever 49 to move the rod 48 slidably to the right to cause the same to slide the valve stem 46 and open the valve 45. When the notch 52 moves into line with the lock 53 the spring pressed lever 54 automatically pushes the detent lock into the notch 52 to lock the rod or stem in position positively to retain the valve 45 in its open position. This down movement of the lock 53 also engages the dog 55 with the ratchet wheel teeth 37, all as shown in Figure 7. The valve 44 now being open, the air, of course, causes the piston to raise the table 10, freeing the plunger 22 so that the spring 21 pushes the same upwardly. As the plunger 22 rises the tail 27 of the pawl 26 rides over the sloped shoulder 30 until the pawl is free to move under the force of spring 29 to engage the ratchet wheel 36 and move it clockwise one step. The upward travel of the plunger 22 is limited when the head of the pawl 28 engages a stop shoulder 56 formed on the plunger carrier body 16 for that purpose. Obviously with the stroke thus limited the pawl 26 can only move the ratchet wheel step by step in increments of one. A double step is impossible and accuracy results. As the ratchet wheel now has moved clockwise one step the dog 55 merely yields up against its spring and immediately holds the gain made to prevent back lash, which is important as the spring 41 is now storing energy.

When the table 10 reaches the upper limit of its travel, the piston which has carried the table up is released and falls by gravity to impart the first jolt or jar to the flask or mold on the table. As it comes down, the table again lowers the plunger 22 and when the table rises again the spring 21 pushes the plunger 22 up the second time to impart the second step to the ratchet wheel 36. As the fifth cycle is about to take place the pin 39 has moved with the wheel 36 to engage the sloped under edge of the shoe 54' and wedge it upwardly with the lock 53 to release the same from the stem notch 52, at the same time freeing the pin 55 from the ratchet wheel teeth 37. Instantly now, the spring 47 is operative to push the valve 45 to closed position to stop further operation of the molding machine. At the same instant the stem 48 is pushed back to its extreme left hand position and the energy of the spring 41 is released to drive the ratchet wheel counterclockwise until it is stopped by the pin 38 striking against the pin 35. The parts have now automatically been returned to the initial starting position, and as soon as a new mold is placed on the table 10 the machine is ready for a new cycle of five jolts when the operator actuates the pad 51 to open the air line and set the parts for operation in the manner already described.

By setting the index wheel plate any number of predetermined jolts can be obtained from one to forty-five on the regulator herein shown, in increments of one. The number of jolts is not limited to forty-five but can be made as large as necessary by increasing the size of the ratchet wheel.

With the use of this regulator the molds can be packed to any density desired with extreme accuracy as positively determined by the number of jolts. Thus, the molding machine can be efficiently operated without wasting air or needlessly wearing out the machine by not properly regulating the number of jolts.

What is claimed is:

1. A jar regulator for a fluid operated molding machine, said regulator comprising a body open on one face, a plunger carrier closing a portion of the open face and carrying a plunger operated means adapted to be actuated through the movement of the molding machine table, a turnable dial plate closing the remainder of said open face and adapted to be angularly set with respect to a telltale mark on the carrier, said regulator having means adapted to open a valve that controls the fluid for actuating the molding machine, rotary means concentric with the dial plate and actuated by the movement of the plunger operated means from an initial starting position through a predetermined angular distance, cooperable stop means between the dial plate and rotary means, means to lock the valve in open position, means operable when the rotary means reaches the predetermined point in its angular travel as determined by the set position of the dial plate to release the valve and permit it to move to closed position, and means to automatically return the rotary means to its initial starting position as determined by said cooperable stop means.

2. A jar regulator for a fluid operated molding machine, said regulator comprising a body open on one face, a plunger carrier closing a portion of the open face and carrying a plunger operated means adapted to be actuated through the movement of the molding machine table, a turnable dial plate closing the remainder of said open face and adapted to be angularly set with respect to a telltale mark on the carrier, said regulator body slidably carrying a manually actuated rod adapted to open a valve that controls the fluid for actuating the molding machine, rotary means concentric with the dial plate and actuated by the movement of the plunger operated means from an initial starting position through a predetermined angular distance, means to lock the rod to hold the valve in open position, means operable when the rotary means reaches the predetermined point in its angular travel as determined by the set position of the dial plate to release the rod lock means whereby the valve may move to closed position, means to automatically return the rotary means to its initial starting position, and cooperable stops between the dial plate and rotary means to cause the rotary means to stop in its initial starting position.

3. A jar regulator for a fluid operated molding machine, said regulator comprising a body open on one face, a plunger carrier closing a portion of the open face and carrying a plunger adapted to be actuated through the movement of the molding machine table, a turnable dial plate closing the remainder of said open face and adapted to be set angularly with respect to a telltale mark on the carrier, said regulator body carrying a manually actuated rod adapted to open a valve that controls the fluid for actuating the molding machine, a ratchet wheel in the body concentric with the dial plate, a pawl carried by the plunger to move the ratchet wheel in a step by step manner with respect to the set dial plate, means to lock the rod to hold the valve in open position, means on the ratchet wheel to release the rod lock means at a predetermined point in the angular travel of the ratchet wheel, means to move the valve to closed position when the rod is unlocked, and means acting simultaneously with the valve closing movement to return the ratchet wheel to its initial starting position, there being cooperable stops between the dial plate and ratchet wheel to determine such starting position.

4. A jar regulator for a fluid operated molding machine, said regulator comprising a body open on one face, a plunger carrier closing a portion of the open face and carrying a plunger adapted to be actuated through the movement of the molding machine table, a turnable dial plate closing the remainder of said open face and adapted to be set in predetermined angular positions with respect to a telltale mark on the carrier, said regulator body carrying a manually actuated rod adapted to open a valve that controls the fluid for actuating the molding machine, a ratchet wheel in the body mounted concentrically with the dial plate, said wheel having an initial starting position from which it may be moved, a pawl carried by the plunger to move the ratchet wheel in a step by step manner from its initial starting position, a spring storing energy as the ratchet wheel turns, a dog to prevent back lash of the ratchet wheel, means to lock the rod to hold the valve in open position, means on the ratchet wheel to release the rod lock means at a predetermined point in the angular travel of the ratchet wheel, said last named means also releasing the dog from the ratchet wheel, means to move the valve to closed position when the rod is unlocked, said spring acting to drive the ratchet wheel reversely to its initial starting position, and cooperable stop means between the dial plate and ratchet wheel to stop the return movement of the ratchet wheel at its initial starting position.

5. A jar regulator for a fluid operated molding machine, said regulator comprising a body open on one face, a plunger carrier closing a portion of the open face and carrying a plunger adapted to be actuated through the movement of the molding machine table, a turnable dial plate closing the remainder of said open face and adapted to be set angularly with respect to a telltale mark on the carrier, said regulator body carrying a manually actuated rod adapted to open a valve that controls the fluid for actuating the molding machine, a ratchet wheel in the body mounted concentrically with the dial plate, said wheel having an initial starting position from which it may be moved, a pawl carried by the plunger to move the ratchet wheel in a step by step manner from its initial starting position, a spring storing energy as the ratchet wheel turns, a dog to prevent back lash of the ratchet wheel, a spring pressed lock pin engaging a notch in the rod to lock the rod and hold the valve in open position, said dog being carried on the lock pin, means on the ratchet wheel to release the rod lock pin and dog from their holding positions at a predetermined point in the angular travel of the ratchet wheel, means to move the valve to closed position when the rod is unlocked, said spring acting to drive the ratchet wheel reversely to its initial starting position, and cooperable stops between the dial plate and ratchet wheel to determine such initial starting position.

6. A jar regulator for a fluid operated molding machine, said regulator comprising a body, a plunger carrier secured to the body and embodying two vertically alined sleeves separated by a space, a plunger slidable in the sleeves and adapted to be engaged by the table of the molding machine to operate the same, a spring in the lower sleeve on which the plunger rests, a pawl carried by the plunger in said space, a ratchet wheel in the body operated by said pawl on the up movement of the plunger, said ratchet wheel being movable from an initial starting position in which it is normally held, a valve in the fluid line for actuating the molding machine table, means for locking the valve in its open position, means controlled by the ratchet wheel when it reaches a predetermined point in its travel to unlock the valve and permit it to move to closed position, means to return the ratchet wheel to its initial starting position, and stop means for the ratchet wheel to determine said starting position.

7. A jar regulator for a fluid operated molding machine, said regulator comprising a body, a plunger carrier secured to the body and embodying two vertically alined sleeves separated by a space, a plunger slidable in the sleeves and adapted to be engaged by the table of the molding machine to operate the same, a spring in the lower sleeve on which the plunger rests, a pawl carried by the plunger in said space, a turnable ratchet wheel in the body operated by said pawl on the up movement of the plunger, said wheel being movable from an initial starting position in which it is normally held, means to urge the pawl into driving engagement with the ratchet wheel on the up stroke of the plunger, means to retain the pawl out of engagement with the ratchet wheel when the plunger is in its lower position, a valve in the fluid line for controlling operation of the molding machine table, means for locking the valve in its open position, means controlled by the ratchet wheel when it reaches a predetermined point in its travel to unlock the valve and permit it to move to closed position, means to return the ratchet wheel to its initial starting position, and a stop means for the ratchet wheel to determine such starting position.

8. A jar regulator for a fluid operated molding machine, said regulator comprising a body, a rod slidably mounted in the body to hold a valve in a fluid line open to cause operation of the molding machine, a pin to lock the rod in position to hold the valve open, a ratchet wheel turnable in the body, means to turn the wheel through actuation of the molding machine, a dog carried on the pin to hold the gain made by the ratchet wheel, a shoe on the pin, and means on the ratchet wheel to engage the shoe to move the pin and dog together to released position to permit the valve to move to closed position.

9. A jar regulator for a fluid operated molding machine, said regulator comprising a body, a rod slidably mounted in the body to hold a valve in a fluid line open to cause operation of the molding machine, a spring pressed pin on the body to engage in a notch in the rod to lock the rod in position to hold the valve open, a ratchet wheel turnable in the body, means to turn the wheel through actuation of the molding machine, a spring pressed dog carried slidably in a bore in the pin to prevent back lash of the ratchet wheel, a shoe on the pin, and means on the ratchet wheel to engage the shoe to move the pin and dog together to released position to permit the valve to move to closed position.

10. A jar regulator for a fluid operated molding machine, said regulator comprising a body open on one face, a plunger carrier closing a portion of the open face and carrying a plunger adapted to be actuated by the molding machine table, a dial plate closing the remainder of said open face and adapted to be set in predetermined angular positions with respect to a telltale mark on the carrier, said regulator body carrying a member adapted to open a valve that controls the fluid for actuating the molding machine, a shaft in said body, said dial plate being turnably carried on the shaft, means on the shaft for locking the dial plate in an adjusted position, a ratchet wheel turnable from a normal initial starting position on the shaft, a pawl movable by the plunger to turn the ratchet wheel, a spring coiled around the shaft and having its ends respectively secured to the shaft and ratchet wheel, means to lock the member to hold the valve in open position, means operable when the ratchet wheel reaches a certain angular point in its travel as determined by the set position of the dial plate to release the lock holding the member and permit the valve to move to closed position, said spring serving to drive the ratchet wheel reversely to its initial starting position, and cooperable stops between the dial plate and ratchet wheel to determine such initial starting position.

11. A jar regulator for a fluid operated molding machine, said regulator comprising a body, a plunger in the body operable by the molding machine table, a shaft in the body turnably carrying a dial plate, means to secure the dial plate in selected positions with respect to a telltale marker on the body, a ratchet wheel turnable on the shaft from an initial starting position in which it is normally held, means actuated by the plunger to move the ratchet wheel step by step, a spring coiled around the shaft and having its ends respectively connected to the shaft and ratchet wheel, a rod slidable in the body and adapted to move a valve in a fluid line that controls operation of the molding machine, means to lock the rod in a position to keep the valve open, and means controlled by the ratchet wheel to release the lock means and permit the valve to close, said spring serving to return the ratchet wheel to its initial starting position, said position being determined by a stop provided for the ratchet wheel and located on the dial plate.

RUSSELL J. ANDERSON.